United States Patent [19]

Contartese et al.

[11] Patent Number: 4,862,057
[45] Date of Patent: Aug. 29, 1989

[54] CYCLE-CONTROLLED POWER CONVERTER

[75] Inventors: Giulio Contartese, Massy; Alain Batlle, Toulouse, both of France

[73] Assignee: Societe anonyme dite: Alcatel Thomson Espace, Paris, France

[21] Appl. No.: 739,262

[22] Filed: May 30, 1985

[30] Foreign Application Priority Data

May 30, 1984 [FR] France ................................ 84 08497

[51] Int. Cl.⁴ .............................................. G05F 1/44
[52] U.S. Cl. .................................... 323/285; 323/277; 323/280
[58] Field of Search ............... 323/275, 276, 277, 280, 323/285

[56] References Cited

U.S. PATENT DOCUMENTS 3,487,291 12/1969 Dowgiallo, Jr. .................... 323/275
4,200,833 4/1980 Wilkerson ........................... 323/285
4,461,990 7/1984 Bloomer ............................ 323/285

Primary Examiner—Patrick R. Salce
Assistant Examiner—Anita M. Ault
Attorney, Agent, or Firm—Sughrue, Mion, Zinn, Macpeak & Seas

[57] ABSTRACT

The converter is designed to provide very great isolation between its input (AB) and its output (MN) in order to prevent disturbances in the input signal effecting the output signal.

At the beginning of each cycle T as defined by a clock circuit (7), a switch (9) allows energy to be transmitted from the input (AB) to the output (MN) for a period of time t1 which is less than T. This period t1 is determined by a comparator (6) which receives a signal representative of the energy received by the input (AB) since the beginning of the cycle from a measuring circuit (1-5).

Particularly applicable to protection against interference.

5 Claims, 2 Drawing Sheets

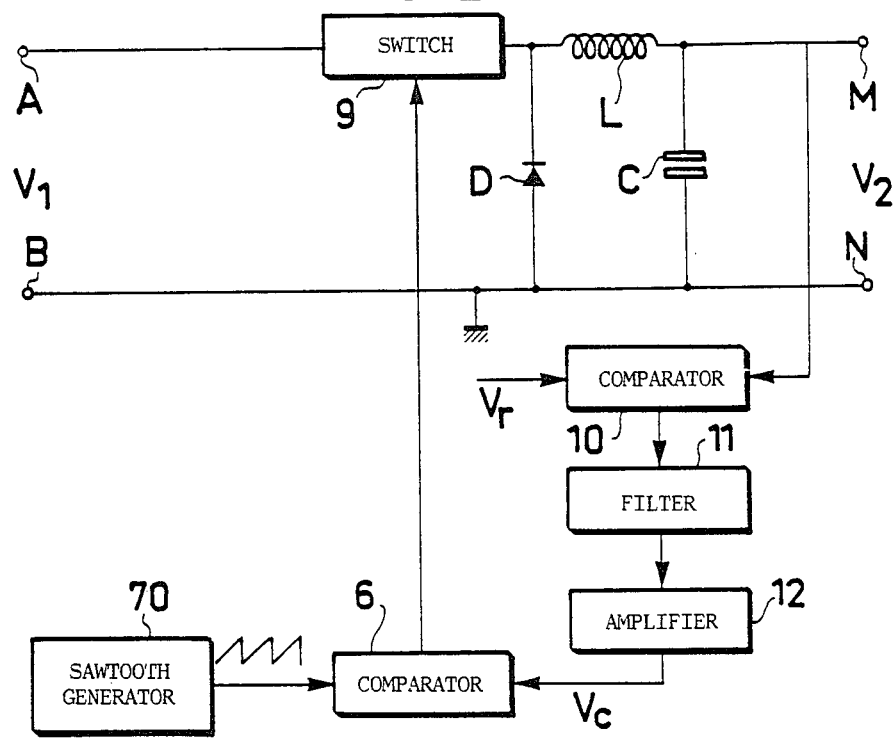
FIG_1 PRIOR ART
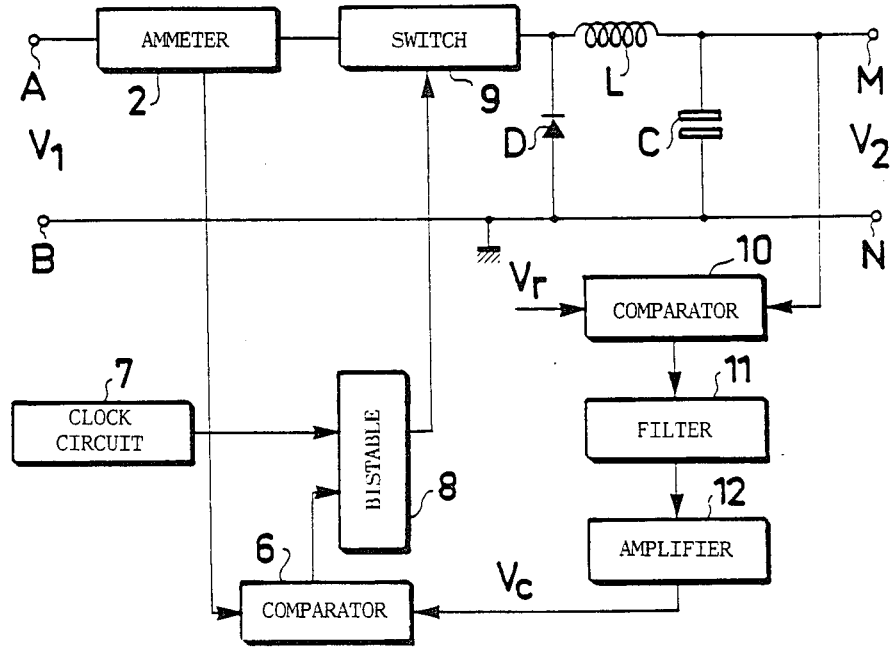
FIG_2 PRIOR ART

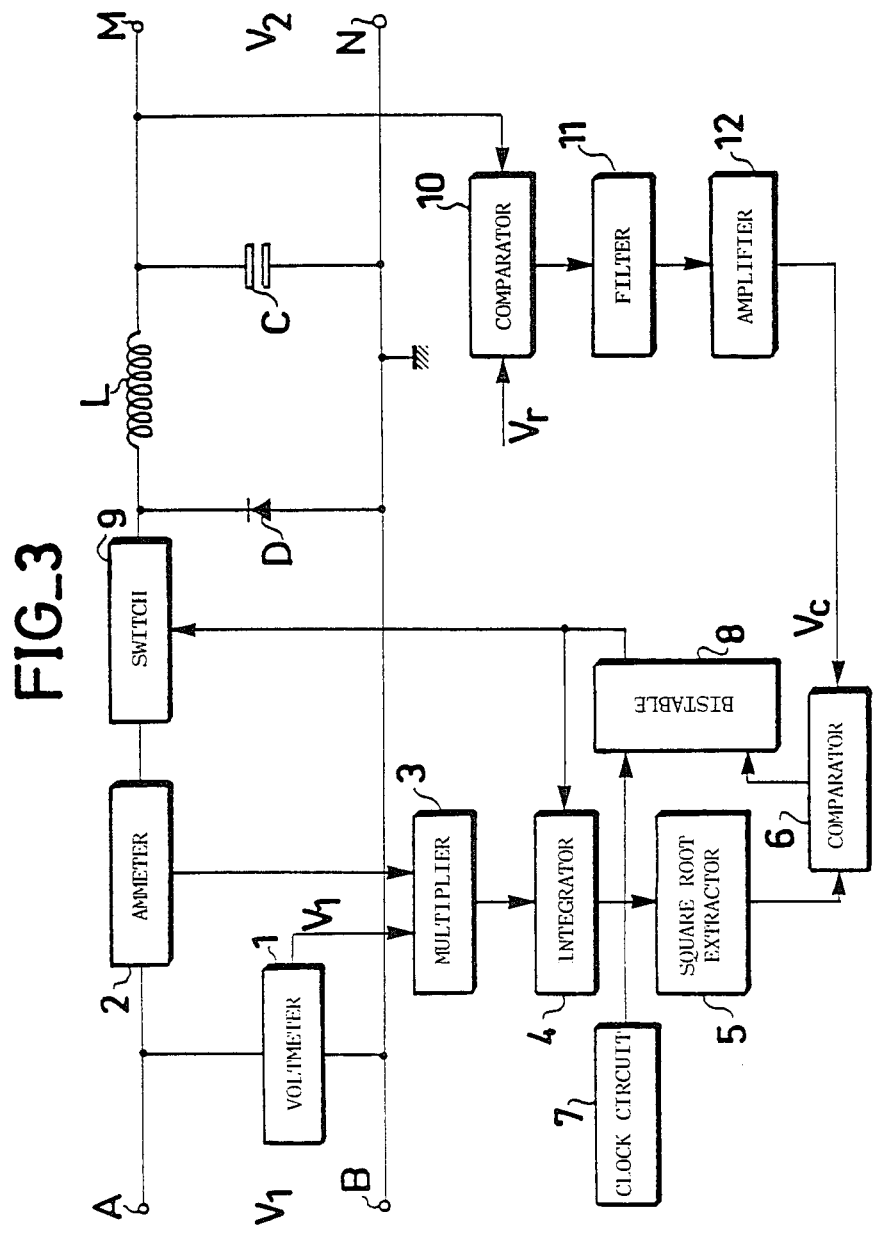

CYCLE-CONTROLLED POWER CONVERTER

BACKGROUND OF THE INVENTION

The present invention relates to a cycle-controlled electrical power converter having DC input, and also known as a switching power supply. The input of the converter is connected to a power supply and the converter includes switch means for interrupting conduction in order to supply a predetermined quantity of energy to its output during each fixed-duration cycle.

Known converters of this type exist in which the switch means are controlled as a function of a control parameter Vc which is a function of the error between an output parameter and a reference value for said output parameter. The control parameter may directly determine the conduction period, or else, for example, it may determine te maximum value of the current to be delivered to the load. Such converters necessarily require servocontrol as a function of their output voltage or current. If such servocontrol is not very effective, the converter allows disturbances present on the inlet power supply to pass through to the outlet load.

SUMMARY OF THE INVENTION

The aim of the present invention is to provide a converter which has very high isolation between its input and its output in such a manner in particular, as to ensure that disturbances in the power supply connected to its input are not, in practice, sensed by a load connected to its output.

This is mainly obtained by controlling the conduction switch means by monitoring energy during each cycle.

According to the invention, a cycle-controlled DC electric power converter comprising an input for connection to a DC power supply, an output for connection to a load, switching means inserted between the input and the output, and means for controlling opening of said switching means, is characterized in that the control means comprise a measuring circuit which is reset to zero at the beginning of each cycle and which has an output for supplying a measurement signal representative of the energy at a given position in the converter, and a comparator coupled to the measuring circuit to control opening by comparing with a control parameter.

BRIEF DESCRIPTION OF THE DRAWINGS

The present invention will be better understood and other characteristics will appear from the following description and the figures referred to therein, in which:

FIGS. 1 and 2 show prior art converters; and

FIG. 3 shows a converter in accordance with the invention.

In the various figures, corresponding items are designated the same references.

DESCRIPTION OF THE PRIOR ART

FIG. 1 shows a prior art converter. This converter comprises an input having two terminals AB which are provided for connection to a DC power supply having an output voltage V1, and an output having two terminals MN provided for connection to a load. A voltage appears across the points M and N when the voltage V1 is applied across the terminals A and B and the load is connected to the output.

The terminals B and N are interconnected by a conductor which is itself grounded. The terminals A and M are interconnected by another conductor in which an electronic switch 9 and an inductance L are inserted in series and in order from the terminal A. A diode D is connected between the point common to the switch 9 and to the inductance L and ground. A capacitor C is connected between the terminals M and N. The inductance L and the capacitor C constitute a converter output filter for regulating the voltage V2. The diode D enables the inductance L to conduct when the switch 9 is open.

A voltage comparator 10 compares the voltage V2 with a fixed voltage Vr. The output from the comparator 10 is connected via a correcting filter 11 followed by an amplifier 12 to the first input of another voltage comparator 6 to provide a voltage Vc thereto. The corrector filter 11 is generally designed as a function of the converter output load and of the frequency band in which interference is to be eliminated. The second input of the comparator 6 receives a rising sawtooth signal having a period T as delivered by a sawtooth generator 70. The output from the comparator 6 is connected to a control input of the switch 9. The comparator 6 opens the switch 9 when the voltage on the sawtooth slope exceeds the voltage Vc. Thus, during a regulation cycle of duration T as determined by the period of the sawtooth signal, the switch 9 is closed during a period $t1 = k'.Vc$, where t1 is not greater than T and where k' is a constant determined by the sawtooth slope.

The FIG. 1 power converter supplies a voltage V2 which, ignoring the losses in various circuit components, is such that:

$$V2/t1 = V1/T$$

substituting $t1 = k'.Vc$, this gives:

$$V2 = (V1.k'.Vc)/T$$

which equation shows that should V1 change suddenly because of a disturbance, it is necessary for the value of Vc to be modified very rapidly as a consequence in order to ensure that the disturbance is not "felt" in the output voltage V2. This requires the regulation loop 10-11-12-6-9-L-D-C to be of very wide bandwidth, which is difficult to achieve.

FIG. 2 shows another example of a prior art converter.

This converter corresponds to the FIG. 1 converter with the addition of an ammeter 2 inserted between the terminal A and the switch 9, and in which the comparator 6 still receives the voltage Vc on its first input, but now receives an output signal from the ammeter 2 on its second input, with its output being connected to the reset to zero input of bistable 8 having a set to 1 input receiving narrow pulses of period T from a clock circuit 7 to determine the beginnings of the conduction cycles, with the non-inverting output from the bistable controlling the switch 9. Thus, when the switch 9 is closed at the beginning of the cycle, the current I1 as measured by the meter 2 increases progressively by virtue of the inductance L. When the measured value of the current I1 reaches a value I max at time t1 (t1<T), which value corresponds to the value Vc (Imax=k".Vc, where k" is a coefficient of proportionality which can be considered as a conductance), the comparator 6 resets the bistable 8 to zero thereby opening the switch 9 until the beginning of the following cycle.

The FIG. 2 power converter provides a quantity of energy E at its output which is a function of V1, Imax and t1:

$$E = f(V1, Imax, t1)$$

and again if V1 increases suddenly because of a disturbance, E will increase and V2 will also be disturbed, unless t1 is very quickly reduced, which requires Vc to be reduced very quickly. In order that this should occur, it is necessary for the bandwidth of the regulation loop 10-11-12-6-8-9-L-D-C to be very wide as in the FIG. 1 case. Making such a loop is problamatical.

DETAILED DESCRIPTION OF THE PREFERRED EMBODIMENT

FIG. 3 shows an example of a power converter in accordance with the invention, in which control is no longer a function of monitoring a voltage as in the FIG. 1, or of monitoring a current as in the FIG. 2 case, but is a function of monitoring energy. Control is provided by measuring energy at some point on the direct path connecting the input AB to the output MN (any point thereon is adequate). This measurement begins at the beginning of each cycle and enables the input to output connection to be interrupted when the measured value reaches a given value.

FIG. 3 corresponds to FIG. 2 except that the direct connection between the ammeter 2 and the comparator 6 is omitted, and the following items are added: a voltmeter 1 connected across the input terminals AB; a multiplier 3 whose two inputs are respectively connected to the output from the voltmeter and to the output from the ammeter; an integrator 4 whose signal input is connected to the output from the multiplier 3; and a square root extractor 5 whose input is connected to the output from the integrator 4 and whose output is connected to the second input of the comparator 6. In the FIG. 3 circuit the output from the bistable 8 not only controls the switch 9, but also resets the integrator 4 to zero.

The FIG. 3 circuit operates at a frequency of 60 kHz, and its clock circuit 7 delivers 1 μs pulses. Thus, since the multiplier 3 supplies the integrator 4 with a signal representative of the product of the voltage and the current delivered to the input of the converter, the integrator 4 delivered a signal representative of the energy delivered between the beginning of a cycle as determined by a pulse from the clock circuit and the instant at which the bistable 8 causes the switch 9 to open. The switch 9 opens at the moment when the quantity of energy measured by means of the wattmeter as constituted by the circuits 1 to 3 and by the integrator 4 exceeds the value of the signal Vc as supplied by the amplifier 12, or more precisely at the moment when the square root of the value of this energy exceeds the value of Vc. At the moment this takes place, the bistable 8 is reset to zero, thereby opening the switch 9 and resetting the integrator 4 to zero. No more energy passes from the input AB to the output MN until the end of the current cycle.

When a disturbance appears at the input AB of a FIG. 3 converter, the energy which said disturbance represents is immediately taken into account by the circuits 1 to 5, and thus by the comparator 6, without requiring rapid modification of the signal Vc as supplied by the amplifier 12. As a result, the design of the regulation loop 10-11-12-6-8-9-L-C-D is greatly simplified.

It should be observed that when it is desired only to provide energy regulation together with good input to output isolation, the FIG. 3 circuit may be modified by omitting the circuits 10 to 12, with the comparator 6 then receiving a fixed voltage Vc at its first input.

Using the FIG. 3 circuit, it has been possible to achieve 40 dB attenuation of interference between the input AB and the output MN using a cycle frequency of 60 kHz and a switching frequency of 80 Hz for the servocontrol loop (circuits 10, 11, 12, 6, 8). By way of comparison, a FIG. 1 converter using a cycle frequency of 100 kHz and a servocontrol loop switching frequency of 30 kHz only achieved 30 dB attenuation of interference between its input and its output.

It should be observed that the output signal from the integrator 4 in FIG. 3 may be directly applied to the second input of the comparator 6. The advantage of the square root extractor 5 is that the variation in gain Vc/V2 of the circuit comprising items 1 to 9, L, D, and C and the output load is reduced when the square root extractor 5 is present in comparison with when it is absent.

Similarly, the FIG. 3 square root extractor 5 may be replaced by any circuit whose output signal is a monotonic function of the input signal.

Various other variants of the FIG. 3 converter may be implemented without going beyond the scope of the invention. Thus, energy may be measured at any point on the direct link between the input AB and the output MN. It may be measured after the switch 9 or after the inductance L. Likewise, the wattmeter constituted by items 1 to 3 in FIG. 3 may be replaced, for example, by a Hall effect wattmeter.

Another variant consists in controlling the switch 9 not only as a function of the energy supplied or of its square root, but as a function of the product of two values, one of which is representative of energy and the other of which may, for example, have the following form $$1/(H + K \cdot |I2|)$$

where H and K are constants and where |I2| represents the absolute value of the current flowing through the load connected to the output terminals of the converter.

We claim:

1. A cycle-controlled DC electrical power converter comprising: an input (AB) for connection to a DC power supply; an output (MN) for connection to a load; switch means (9) inserted between the input and the output; and control means (1-8) for causing said switch means to open, characterized in that the control means comprise a measuring circuit (1-5) which is reset to zero with the beginning of each cycle and which has an output on which it supplies a measurement signal reprsentative of the energy at the input to the converter, and a comparator (6) coupled to the measuring circuit for controlling said opening by comparison with a control parameter (Vc).

2. A converter according to claim 1, characterized in that it comprises a comparator circuit (10) for comparing the output voltage (V2) from the converter with a reference voltage (Vr), said comparator circuit being coupled to the comparator (6) to supply the control parameter (Vc) thereto.

3. A converter according to claim 1, characterized in that it comprises a bistable (8) having two inputs, with one of its two inputs one and two being controlled by clock signals which appear at the beginning of each cycle, and with the other input being controlled by the comparator (6), and having an output which is coupled to a control input of the switch means (9).

4. A converter according to claim 3, characterized in that the measuring circuit comprises a wattmeter (1-3) followed by an integrator circuit (4) having a reset to zero input coupled to the output from the bistable (8) and having an output coupled to the comparator (6).

5. A cycle-controlled DC electrical power converter comprising: an input (AB) for connection to a DC power supply; an output (MN) for connection to a load; switch means inserted between the input and the output; and control means for causing said switch means to open, characterized in that the control means comprise a measuring circuit which is reset to zero with the beginning of each cycle and which has an output on which it supplies a measurement signal representative of the energy at the input to the converter, and a comparator coupled to the measuring circuit for controlling said opening by comparison with a control parameter (Vc); wherein said measuring circuit comprises a transformation circuit supplying an output signal whose value is a monotonic function of the value of a signal applied to its input, said transformation circuit having an output which constitutes the output from the measuring circuit.

* * * * *